(12) United States Patent
Wood

(10) Patent No.: US 10,520,222 B2
(45) Date of Patent: Dec. 31, 2019

(54) EXTERNAL SECONDARY SOLAR CONCENTRATOR

(71) Applicant: Frontline Aerospace, Inc., Broomfield, CO (US)

(72) Inventor: Ryan S. Wood, Broomfield, CO (US)

(73) Assignee: FRONTLINE AEROSPACE, INC., Broomfield, CO (US)

(*) Notice: Subject to any disclaimer, the term of this patent is extended or adjusted under 35 U.S.C. 154(b) by 546 days.

(21) Appl. No.: 15/400,542

(22) Filed: Jan. 6, 2017

(65) Prior Publication Data

US 2017/0191698 A1 Jul. 6, 2017

Related U.S. Application Data

(60) Provisional application No. 62/275,345, filed on Jan. 6, 2016.

(51) Int. Cl.
*F24S 23/79* (2018.01)

(52) U.S. Cl.
CPC .................... *F24S 23/79* (2018.05)

(58) Field of Classification Search
CPC ....... F24S 10/75; F24S 23/74; F24S 2023/834
USPC .......................................................... 126/692
See application file for complete search history.

(56) References Cited

U.S. PATENT DOCUMENTS

| | | | | |
|---|---|---|---|---|
| 4,026,273 A | * | 5/1977 | Parker | F24S 23/74 126/649 |
| 4,180,055 A | * | 12/1979 | Hudnall | F24S 10/40 126/658 |
| 4,348,793 A | * | 9/1982 | Bloem | F24S 10/45 29/890.033 |
| 4,394,814 A | * | 7/1983 | Wardman | F03G 6/06 60/641.15 |
| 4,432,345 A | * | 2/1984 | McIntire | F24S 20/20 126/694 |
| 4,494,529 A | * | 1/1985 | Lew | H01L 31/0543 126/648 |
| 5,154,163 A | * | 10/1992 | Rabl | G02B 19/0042 126/690 |
| 5,537,991 A | | 7/1996 | Winston et al. | |

(Continued)

OTHER PUBLICATIONS

Price et al., Advances in Parabolic Trough Solar Power Technology, Journal of Solar Energy Engineering, 2002, pp. 109-125, vol. 124, The American Society of Mechanical Engineers, New York, New York.

(Continued)

*Primary Examiner* — Jorge A Pereiro
(74) *Attorney, Agent, or Firm* — Marsh Fischmann & Breyfogle LLP; Russell T. Manning

(57) ABSTRACT

An external concentrator is disclosed for use in concentrating reflected solar radiation (e.g., beams or rays) onto a heat collection element (HCE) located at a focal point of a parabolic mirror. The external concentrator includes at least first and second elongated ribs that are adapted to extend radially outward from the outside surface of an HCE and along a linear length (e.g., a portion or all) of the HCE to redirect stray/spilled light into the absorber tube of the HCE. The radial extension of the ribs above the outside surface of the HCE allows a reflective surface of the rib to redirect stray reflected beams/rays that would otherwise bypass the HCE back onto the HCE.

13 Claims, 8 Drawing Sheets

(56) References Cited

U.S. PATENT DOCUMENTS

| | | | |
|---|---|---|---|
| 2004/0261788 A1* | 12/2004 | Winston | F24S 10/45 |
| | | | 126/652 |
| 2009/0183731 A1* | 7/2009 | Capan | F24S 30/425 |
| | | | 126/605 |
| 2013/0092154 A1* | 4/2013 | Lu | F24S 30/425 |
| | | | 126/600 |
| 2014/0001766 A1* | 1/2014 | Sayer | F03G 6/04 |
| | | | 290/1 R |
| 2017/0363330 A1* | 12/2017 | Kirscht | F24S 23/79 |
| 2017/0370618 A1* | 12/2017 | Zhu | F24S 23/79 |
| 2018/0067292 A1* | 3/2018 | Noble | G02B 19/0042 |

OTHER PUBLICATIONS

Kutscher et al., Generation of a Parabolic Trough Collector Efficiency Curve From Separate Measurements of Outdoor Optical Efficiency and Indoor Receiver Heat Loss, Journal of Solar Energy Engineering, 2012, vol. 134, The American Society of Mechanical Engineers, New York, New York.

Kutscher et al., Generation of a Parabolic Trough Collector Efficiency Curve from Separate Measurements of Outdoor Optical Efficiency and Indoor Receiver Heat Loss, conference paper presented at SolarPACES 2010, Oct. 2010, pp. 1-10, contract No. DE-AC36-08GO28308, project No. NREL/CP-5500-49304, task No. CP09.1001, National Renewable Energy Laboratory, U.S. Department of Energy, Perpignan, France.

Kutscher et al., Heat Loss Testing of Schott's 2008 PTR70 Parabolic Trough Receiver, technical report prepared under task No. CP09.1001, May 2009, pp. 1-58, contract No. DE-AC36-08GO28308, project No. NREL/CP-5500-49304, National Renewable Energy Laboratory, U.S. Department of Energy, Golden, Colorado.

Ustaoglu et al., Evaluation of Dual Combined Parabolic Solar Concentrator in Evacuated Tube, presented at the Seventh International Symposium on Radiative Transfer, Jun. 2013, pp. 1-3, The International Centre for Heat and Mass Transfer, RAD-13, Kusadasi, Turkey.

White et al., Advanced Parabolic Concentrator for Grid Competitiveness, World Renewable Energy Forum (WREF) 2012, May 2012, pp. 56-61, vol. 1, American Solar Energy Society, Curran Associates, Inc., Red Hook, New York.

\* cited by examiner

US 10,520,222 B2

EXTERNAL SECONDARY SOLAR CONCENTRATOR

CROSS REFERENCE

The present application claims the benefit of the filing date of U.S. Provisional Application No. 62/275,345 having a filing date of Jan. 6, 2016, the entire contents of which are incorporated herein by reference.

FIELD

The present disclosure is directed to improving the performance of parabolic trough solar collectors. More specifically, the present disclosure is directed to a secondary solar concentrator that improves concentration of beam radiation onto tubular receivers or heat collection elements (HCE's) of parabolic trough solar collectors.

BACKGROUND

A parabolic trough power plant generates electricity using concentrated sunlight as the heat source for its power cycle. Most commonly rows of single-axis-tracking, linear parabolic mirrors form a solar field that concentrate beam radiation onto tubular receivers which are also known as heat collection elements (HCEs). See, e.g., FIG. 1A. The HCE's are located along the focal line of each parabolic trough. Heat-transfer fluid pumped through the HCE's is heated by the solar heated receiver walls on which the parabolic mirrors focus solar radiation. See, e.g., FIG. 1B. After being heated by the solar field, the heat-transfer fluid is typically used generate high-pressure superheated steam in a series of heat exchangers. Most commonly, the energy in the steam is converted to electricity in a Rankine steam turbine power cycle. After passing through the heat exchangers, the cooled heat transfer fluid is recirculated through the HCEs.

SUMMARY

Aspects of the presented inventions are based on the recognition by the inventor that the focal point of linear parabolic reflectors/mirrors is often not exact. That is, the consistency of the actual foci of the parabolic mirrors as it focuses light onto the HCE's is somewhat loose in tolerance. Along these lines, a portion of the beam radiation reflected by the mirrors may not contact the heat collection elements mounted along the foci of the linear parabolic reflectors. Stated otherwise, some of the reflected beam radiation is lost via spillage. The reflected beam radiation which never contacts an HCE is lost energy that could further heat the heat-transfer fluid and improve overall efficiency of the system. To reduce such spillage, the presented inventions are directed to a secondary solar concentrator that may be affixed about an external surface of an existing HCE to capture and redirect reflected beam radiation that would otherwise bypass the HCE.

In one aspect, an external concentrator includes at least first and second elongated ribs that are adapted to extend radially outward from the outside surface of an HCE and along a linear length (e.g., a portion or all) of the HCE to redirect stray/spilled light into the absorber tube of the HCE. Typically, each elongated rib includes an edge surface that is disposed on or proximate to a surface of the HCE. Each rib includes at least one reflective side surface that extends above the outside surface of the HCE. This extension above the outside surface of the HCE permits the reflective surface of the rib to redirect stray reflected light beams/rays (i.e., which would otherwise bypass the HCE) onto the HCE. The number and spacing of the ribs may be varied. Additionally, the cross-sectional shape and radial length of the ribs may be varied. In any arrangement, the ribs form a reflective surface that allows for redirecting stray light into the HCE.

In a further arrangement, the external concentrator includes two sets of ribs that are disposed on different radial sections of the outside surface of the HCE. In such an arrangement, the different sets of ribs may be separated by a reflective shield that covers a portion of the HCE tube. Most commonly, when applied to an HCE tube, the reflective shield is disposed outside of the tube opposite of the vertex of a parabolic reflector that focuses light onto the tube.

In another aspect, a method is provided for retrofitting existing parabolic trough power plants to increase efficiency.

DETAILED DESCRIPTION

Reference will now be made to the accompanying drawings, which assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Figure 1A:
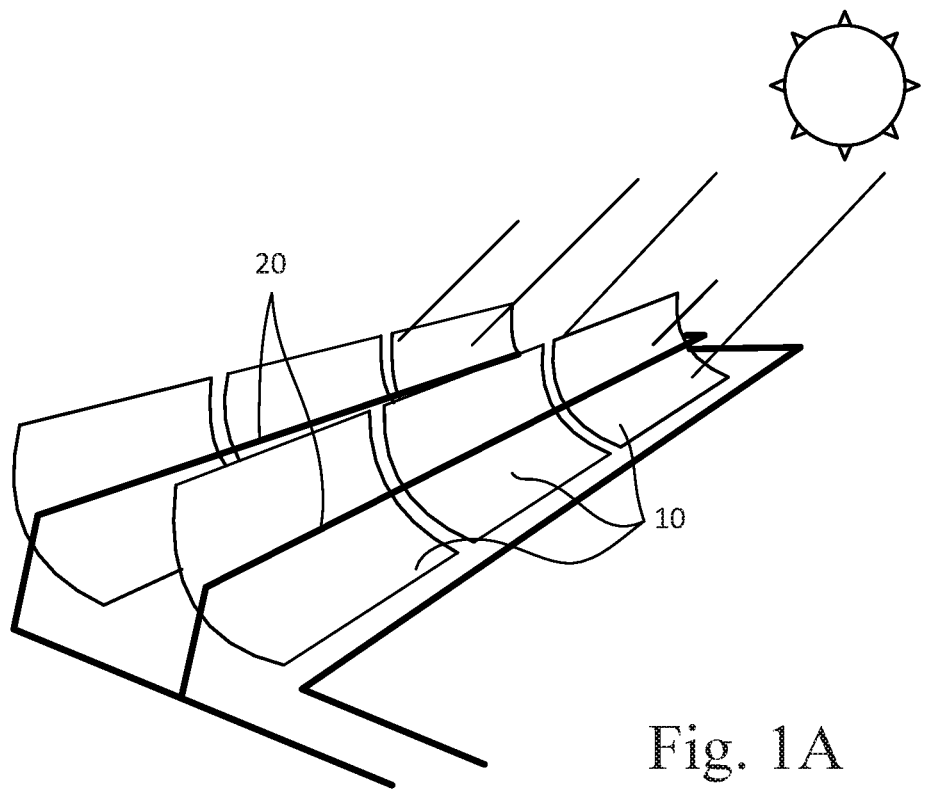
FIG. 1A illustrates a solar field formed of a plurality of parabolic reflectors.
Figure 1B:
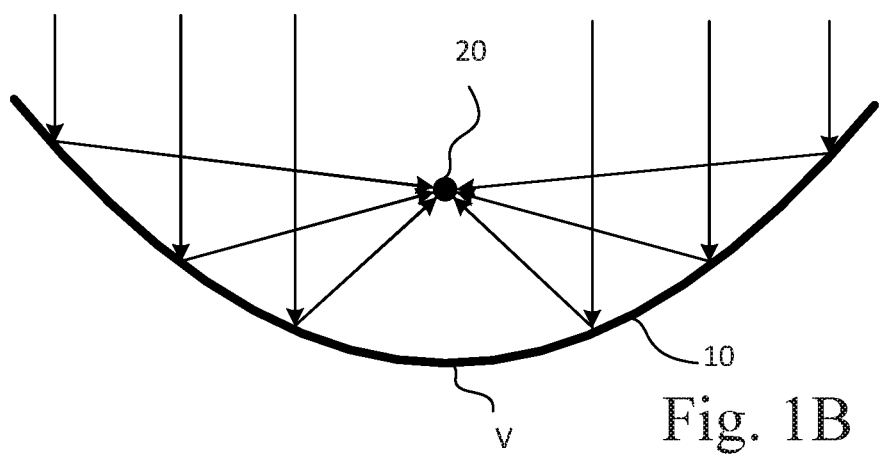
FIG. 1B illustrates a cross-sectional view of parabolic reflector focusing solar energy on a focal point.

FIG. 1A illustrates an exemplary parabolic trough solar assembly having a plurality of linear parabolic mirrors/reflectors 10. As shown, the linear parabolic reflectors 10 are disposed in rows and each row of reflectors concentrates or focuses solar radiation onto a receiver tube(s) or heat collection element(s) (hereafter 'HCE') 20 linearly disposed along the linear focal lines/points of the reflectors 10. FIG. 1B shows a cross-section of a parabolic trough 10 with an ideal focal point at the HCE 20. That is, the reflectors are oriented such that reflected sunlight concentrates on the HCE 20, which contains a circulating heat transfer fluid that is heated to a high temperature by the energy of the concentrated sunlight. The heat transfer fluid (often thermal oil) runs through the HCE to absorb the concentrated sunlight. This increases the temperature of the fluid. In some cases the fluid is heated to 400° C. The heat transfer fluid is then most commonly used to heat steam in a turbine generator. Other thermal uses are possible.

Figure 2:
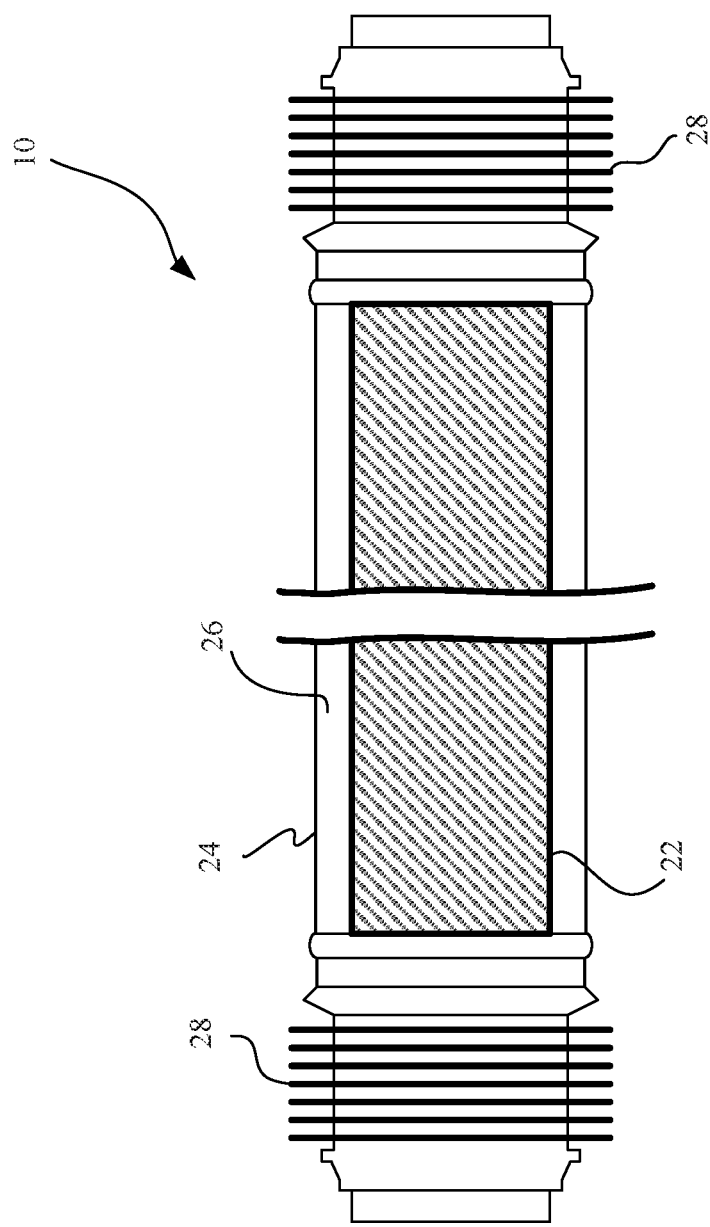
FIG. 2 illustrates one embodiment of a heat collecting element.

FIG. 2 illustrates one non-limiting embodiment of an HCE 20. It will be appreciated that such HCE's may be of considerable length (e.g., 4 m and more) and the illustrated embodiment is for purposes of discussion only. The HCE 20 includes a steel absorber tube 22 through which the heat transfer fluid flows. A common outside diameter for such an absorber tube is around 70 mm; however this is not a requirement. The outside surface of the absorber tube 22 typically includes a solar selective absorber surface. Further, the HCE 20 includes an annular glass envelope 24 concentrically disposed about the absorber tube 22. A common outside diameter for such a glass envelope is 115 mm; however this is not a requirement. The increased diameter of the glass envelope defines an annulus 26 between the inside surface of the glass envelope 24 and the outside surface of the absorber tube 22. The annulus 26 is evacuated to reduce heat losses at high operating temperatures and to protect the solar selective absorber surface from oxidation. As further shown, the ends of the illustrated HCE 20 include bellows 28, which accommodate thermal expansion differences between the steel absorber tube and the glass envelope.

Figure 3A:
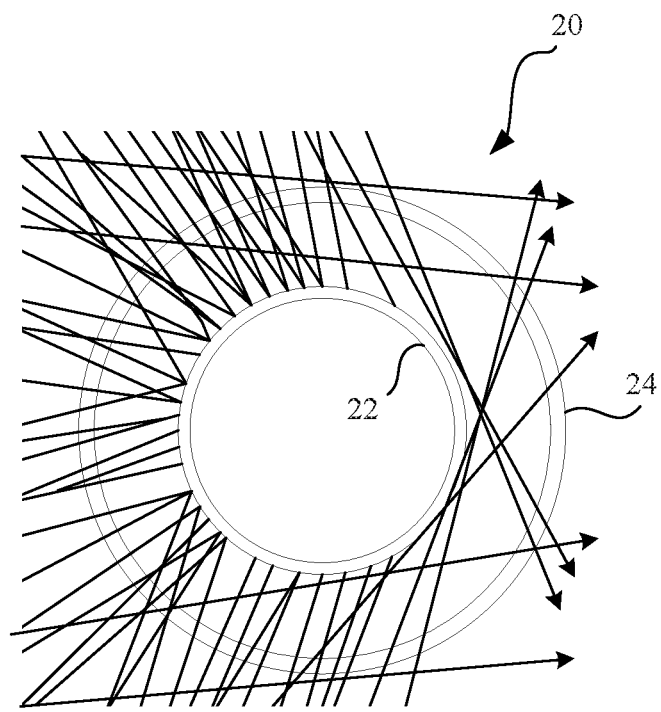
FIG. 3A illustrates spillage of reflected light at a heat collecting element.

FIG. 3A illustrates the concentration of sunlight energy/rays on the absorber tube 22 to heat the tube and the heat-transfer fluid therein. The parabolic reflector (not shown) reflects sunlight rays onto the HCE 20, which is disposed at the focal point of the reflector. As shown, a majority the reflected sunlight rays impinge on the absorber tube 22. However, due to mirror surface imperfections, sunlight tracking misalignments and/or other optical-mechanical phenomena, some of the reflected sunlight rays bypass the HCE without contacting the absorber tube 22. That is, some spillage occurs due to the imperfection of the focal point of the parabolic reflector. Such spillage reduces the overall efficiency of the HCE. Accordingly, the presented inventions are directed to an external or secondary reflector/concentrator that is attachable to the outside surface of an HCE (e.g., glass envelope 24), which captures reflected sunlight rays from the parabolic or primary reflector/concentrator that would normally be lost via spillage.

Figure 4A:
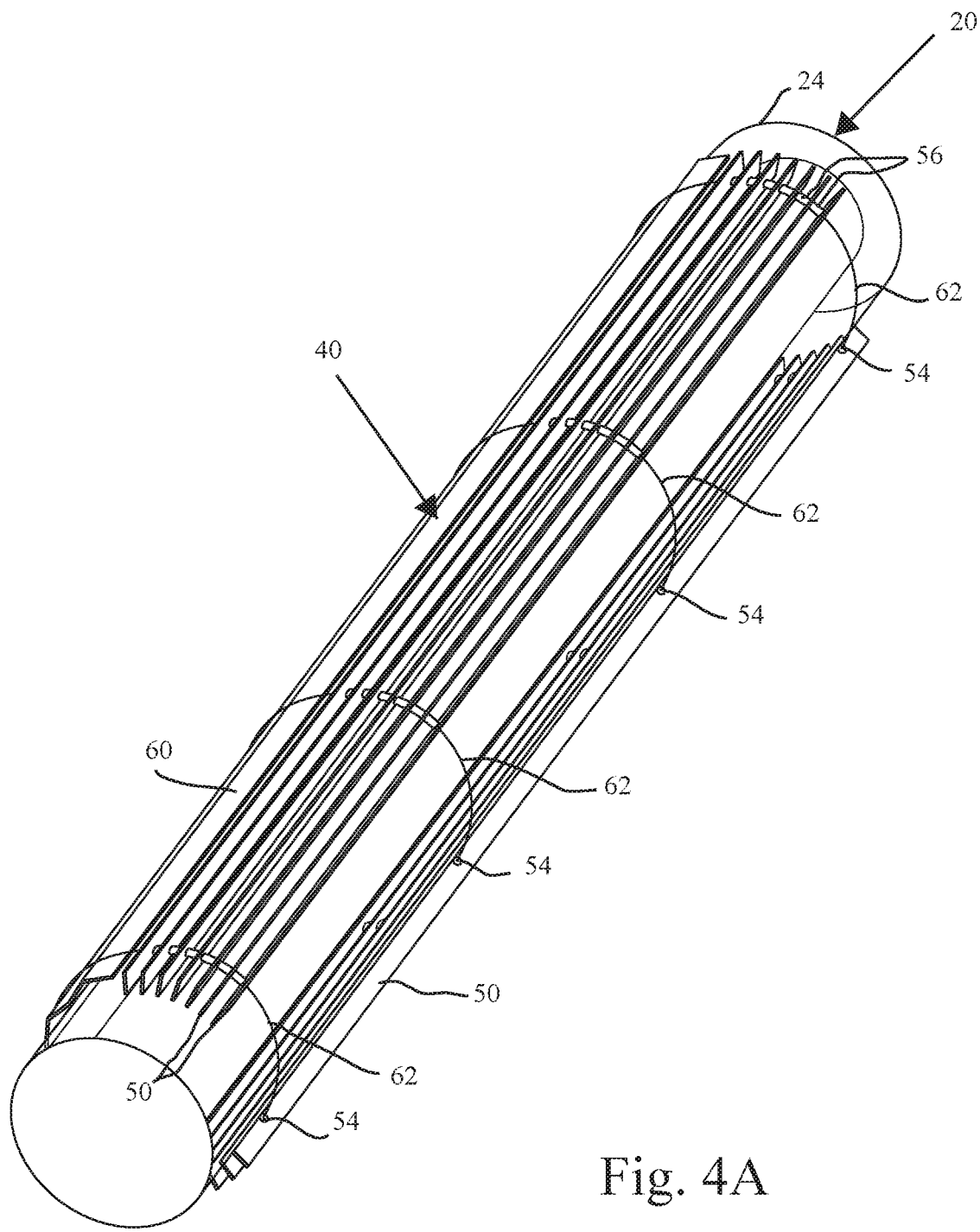
FIGS. 4A and 4B illustrate first and second perspective views of an external concentrator as applied to a heat collecting element.
Figure 4B:
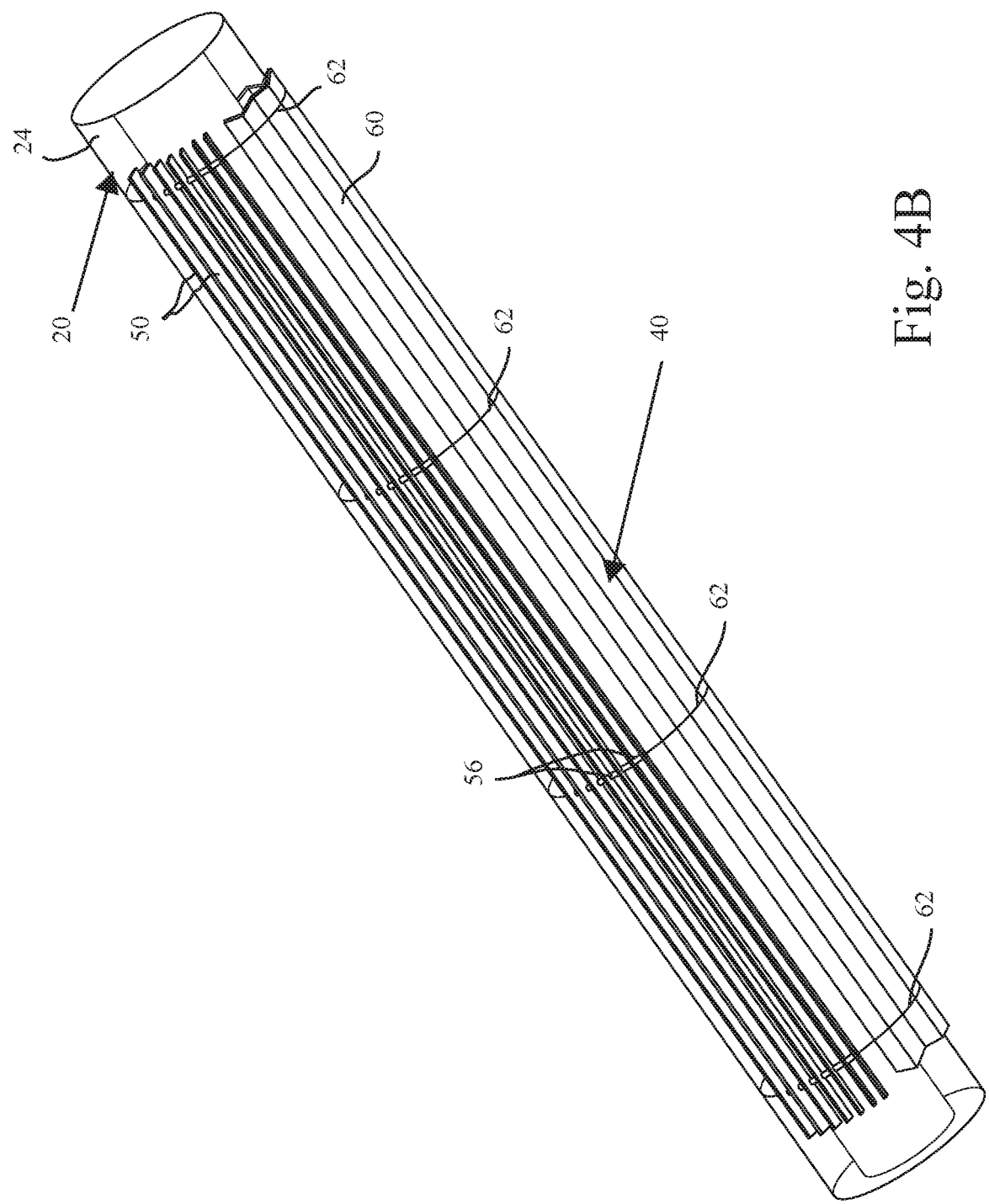
Figure 5A:
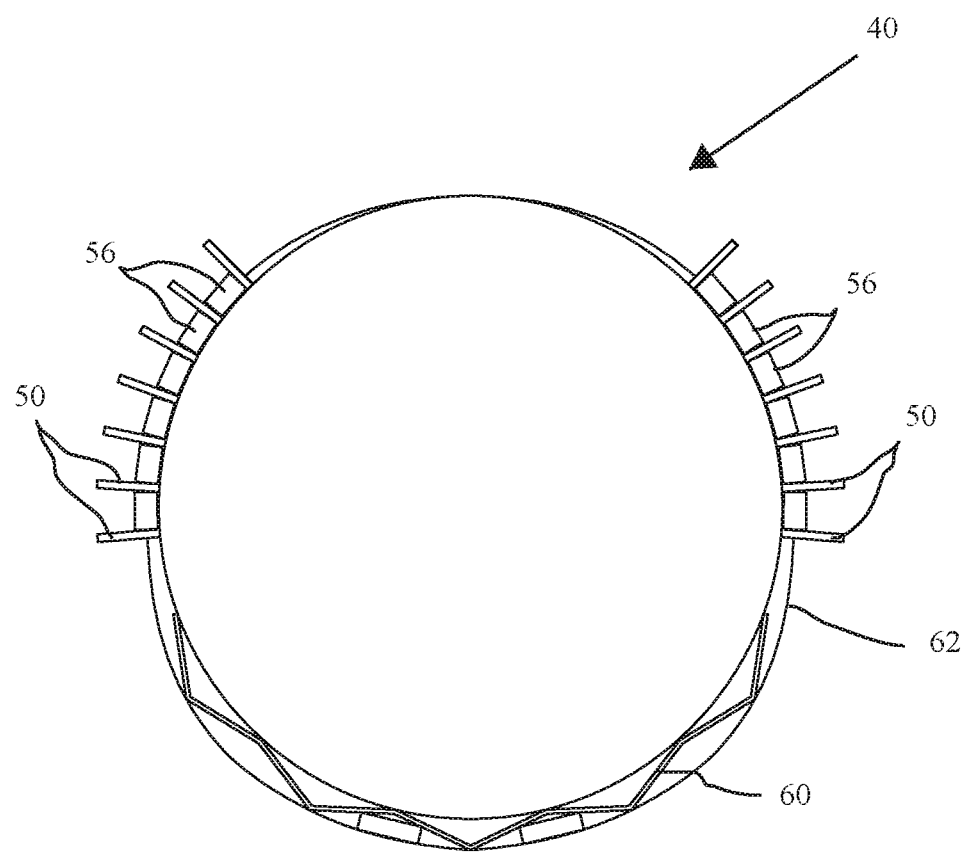
FIGS. 5A and 5B illustrate first end second and views of an external concentrator.
Figure 5B:
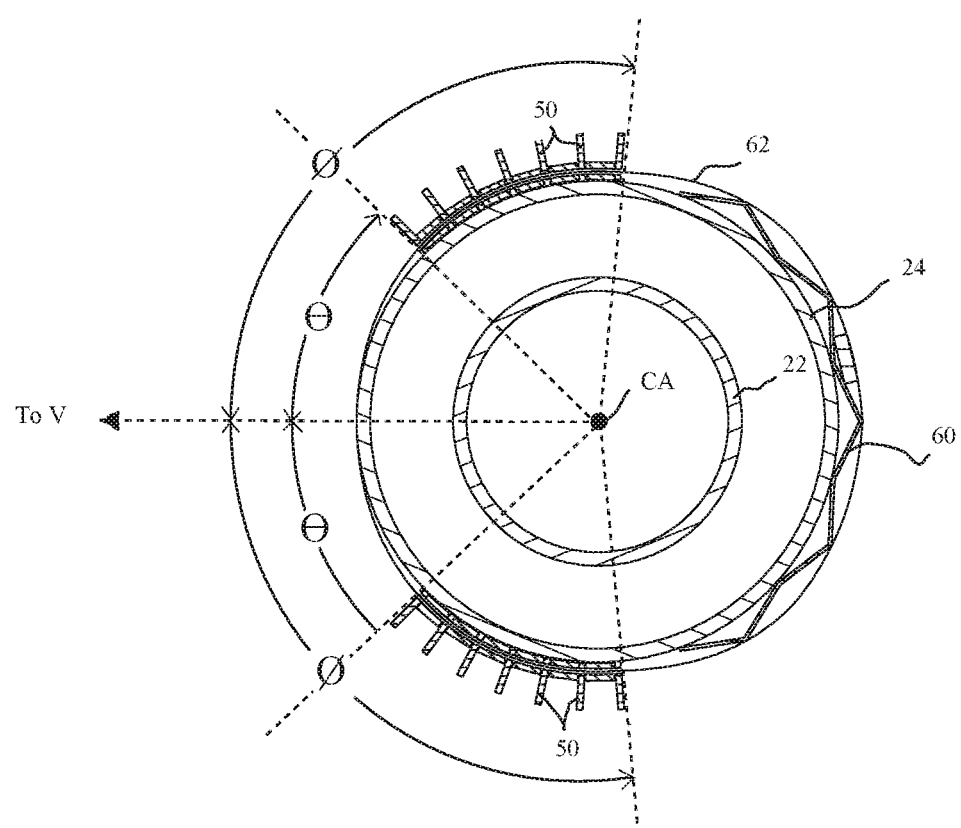

FIGS. 4A and 4B illustrate first and second perspective views of an external concentrator 40 as applied to an HCE 20. More specifically, these figures illustrate the external concentrator 40 as disposed about an outside surface of the glass envelope 24 of the HCE. FIGS. 5A and 5B illustrate a cross-sectional end view of the external concentrator 40 and the external concentrator as applied to the HCE 20, respectively. As shown, the external concentrator 40 includes a series of reflective ribs 50 that extend along the length of the HCE substantially parallel to the parabolic trough and its focal line once the external concentrator 40 is attached to the HCE 20. In the illustrated embodiment, the external concentrator 40 includes two sets of reflective ribs 50, which are separated by a reflective shield 60.

As shown, each of the ribs is an elongated element that is substantially rectangular in cross-section having two ends/edges and two opposing side surfaces. However, it will be appreciated that in further embodiments the ribs 50 may be shaped (e.g., curved, parabolic cusp etc.). Most commonly, the ribs will each have an end/edge surface that may be disposed along the length of the HCE 20. However, in other embodiments the ribs may be spaced above the surface of the HCE 20. The cross-sectional height of each rib, extending radially outward from the surface of the HCE 20, permit gathering of stray and misaligned reflected light rays while allowing properly directed light rays to pass into the HCE. In this regard, one or both side surfaces of each of the ribs 50 forms a reflector that allows for capturing stray and misaligned reflected light rays, which may then be redirected onto the absorber tube 22 within the evacuated glass envelope 24. To redirect the stray reflected light rays, one or both side surfaces of the ribs is a partially reflective surface, which may be formed of, for example, reflective polished aluminum or specially coated reflective metal. Alternatively, a reflective film may be applied to the ribs 50.

Figure 3B:
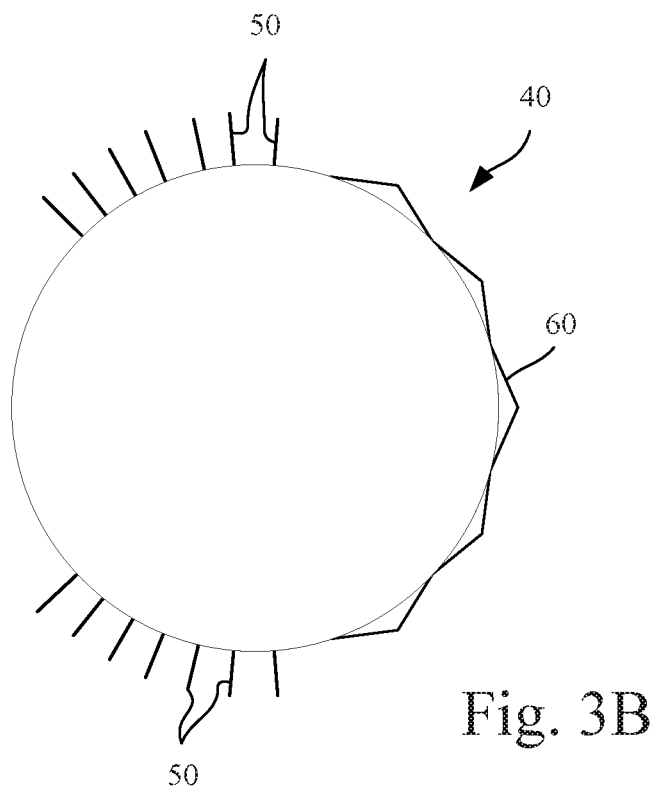
FIG. 3B illustrates an end view of an external concentrator.
Figure 3C:
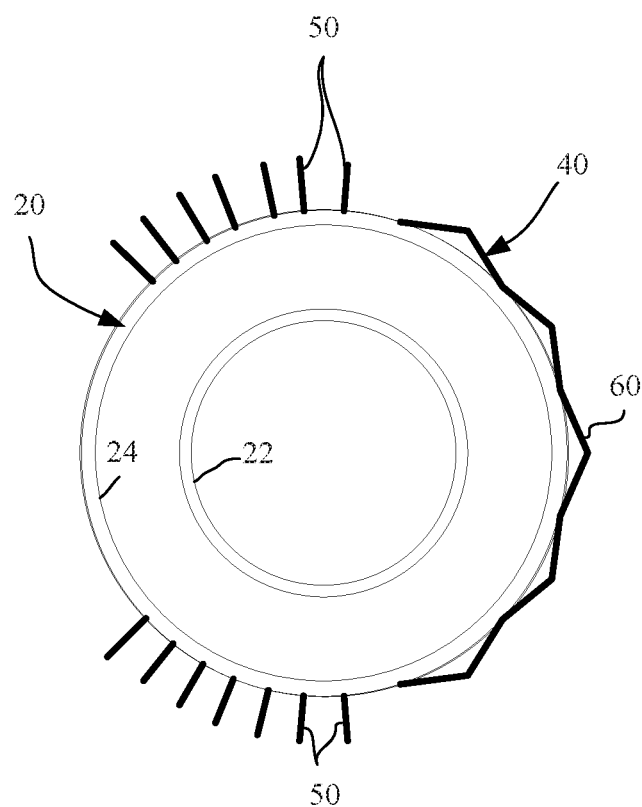
FIG. 3C illustrates an end view of an external concentrator as applied to the heat collecting element.
Figure 3D:
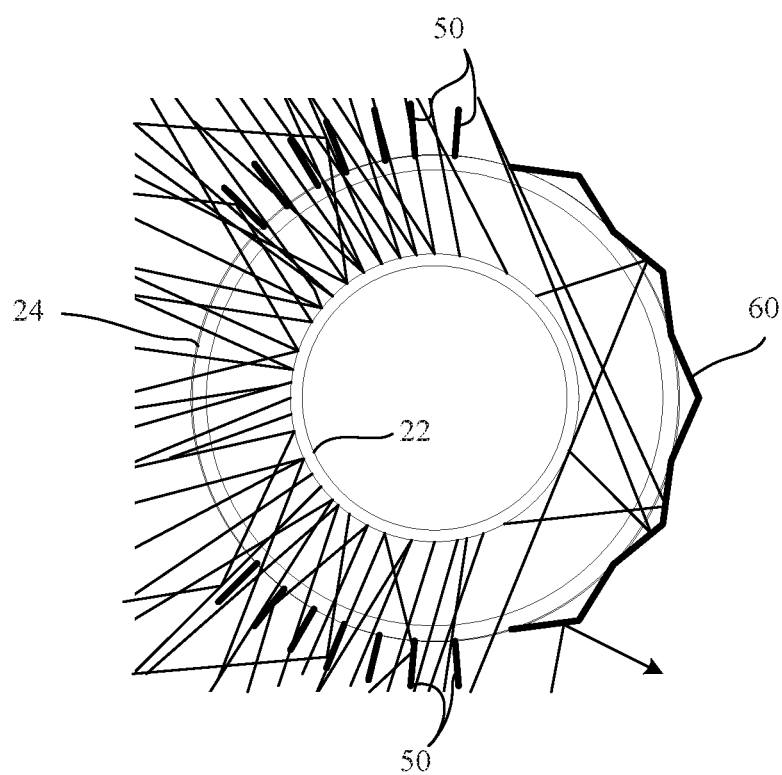
FIG. 3D illustrates the external concentrator of FIG. 3C redirecting spilled light the FIG. 3A onto the heat collecting element.

The redirection of the stray and misaligned light rays by the ribs 50 is at least partially illustrated in FIGS. 3A-3D. As noted above, FIG. 3A illustrates the spillage of light rays that are reflected by the parabolic reflector but fail to contact the absorber tube 22. FIG. 3B illustrates an end-view of the external concentrator 40 and FIG. 3C illustrates the external concentrator 40 as applied to the HCE 20. FIG. 3D illustrates the reflected light rays of FIG. 3A as redirected upon the attachment of the external concentrator 40 the outside surface of the HCE 20. As shown, the ribs 50 which extend radially outward allow for capturing and redirecting a portion of stray light rays back onto the absorber tube 22. Further, due to the substantially radial alignment of the ribs 50, the ribs do not interfere with incoming light rays, which are properly focused on the absorber tube 20. That is, even if properly reflected incoming light rays contact the ribs, they are most commonly redirected to another point on the absorber tube 22.

While the ribs 50 provide the ability to capture some additional light rays which would otherwise spill past the HCE 20, it is been recognized that additional spilled light rays may be recaptured by the use of the external reflective shield 60. The illustrated embodiment of the reflective shield 60 is a corrugated element that is adapted for disposition on a radial outside portion of the HCE 20. In this illustrative embodiment, the reflective shield 60 has a corrugated surface consisting of a plurality of rectangular cross-sectional sections (e.g., flat cross-sections) disposed to form alternating ridges and grooves. However, in other embodiments the reflective shield 60 may have a corrugated surface consisting of a plurality of shaped (e.g., curved surfaces, parabolic cusps, etc.) cross-sectional sections disposed to form alternating ridges and grooves. Alternatively, the shield may be non-corrugated such as a semi-circular or parabolic surface. In any embodiment, the reflective shield 60 is disposed on the outside surface of the glass envelope 24 on the side of the glass envelope that is opposite of the vertex V of the parabolic reflector. See, e.g., FIGS. 1A and 5B. Typically, the reflective shield covers between about 15° (i.e., ~0.25 rad) and about 120° (i.e., ~2.1 rad) of the outside surface of the HCE. Referring again to FIG. 3D, it is shown that the inclusion of the reflective shield 60 significantly improves the redirection of spilt light rays back onto the absorber tube 22.

As noted above, the disclosed embodiment of the external concentrator 40 utilizes a pair of rib sets 50 that are separated by a reflective shield 60. The size and orientation of each of these elements may be varied. For instance, the number of the rib reflectors of each rib set may be varied based on physical parameters of the system with which they are used. Commonly, a height of the ribs in the radial direction (e.g., radial length) will be between about ½ cm and about 3 cm. However, other sizes are possible and considered within the scope of the presented inventions. For instance, the height of the ribs may vary based on the diameter of the HCE. Along these lines, the height of the ribs may be between about 1% and 40% of the diameter of the HCE. Further, it will be appreciated that the axial length of the ribs may be varied based on, for example, the length of an HCE on which the ribs will be placed. Likewise, the number and placement of the radial ribs about the outside surface of the HCE 20 may likewise be varied. Currently, it is believed that the location of the reflectors should extend from approximately 30° (i.e., θ) on either side of a reference line between the vertex of the parabolic receiver and a central axis CA of the HCE 20 to about 90° (i.e., ϕ)) on either side of the reference line. However, these angles may be increased plus or minus 30°. See FIG. 5B.

In addition to varying the orientation of the ribs 50 in relation to the HCE 20, individual ribs 50 may have different radial lengths. In certain embodiments, the radial length of any rib 50 may be 1% to 40% of the HCE 20 diameter, and different ribs 50 may have different radial lengths within this range. For example a first rib may have a first radial length that is 20% of the HCE 20 diameter and a second rib may have a second radial length that is 15% of the HCE 20 diameter. In certain embodiment each rib 50 may be chosen to have a different radial length. It will be understood that one skilled in the art may vary the radial length and orientation of each rib 50 independently of the other ribs to increase radiation received by the HCE 20. Moreover, as described above, various ribs 50 may also take on different shapes (e.g., a first rib may be rectangular and another rib 50 may be curved). The shape may also be varied with the radial length and the orientation to increase the radiation received by the HCE 20.

To correctly position the ribs and reflective shield, the present embodiment of the external concentrator 40 utilizes wire cables 62 that are spaced along the length of the concentrator 40. See FIGS. 4A and 4B. As shown, the wires 62 extend through apertures 54 in the base of each of the ribs. To provide appropriate spacing between each of the ribs, an annular spacer 56 may be disposed between each adjacent pair of ribs. In this regard, the wire passes through the annular spacer 56 which maintains a desired spacing between the bases of adjacent ribs. Further will be appreciated that the ribs may be equally spaced or different sets of ribs may utilize different spacing. In the present embodiment, the wires 62 also extend around the outside surface of the shield 60 to maintain its position on the HCE. Various spacers may be incorporated between the shield and the ribs and or that the wire may extend through one or more apertures may be formed within the shield. In any arrangement, the wires allow for conveniently attaching and detaching the device with the outside surface of the HCE. The ability to attach the described solar concentrators to outside or external surfaces of HCEs provides a significant benefit. Specifically, the external attachment allows retrofitting existing HCEs.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A solar concentrator configured for attachment to a generally cylindrical outside surface of a heat collection element (HCE) positioned along a focal line of a parabolic reflector, comprising:

a first set elongated ribs, each rib having an edge surface and a reflective side surface, wherein said first set of elongated ribs are disposed adjacently along an outside surface the HCE, wherein reflective side surfaces said first set of elongated ribs extend outward from the outside surface of the HCE;

a second set elongated ribs, each rib having an edge surface and a reflective side surface, wherein said second set of elongated ribs are disposed adjacently along the outside surface the HCE, wherein reflective side surfaces said second set of elongated ribs extend outward from the outside surface of the HCE;

an elongated reflective shield having a reflective surface disposed toward the outside surface of the HCE, wherein said reflective shield is disposed along the outside surface of the HCE between a first radial position of said first set of elongated ribs and a second radial position of said second set of elongated ribs; and a tensile element extending around or through said first and second sets of elongated ribs and said reflective shield to secure said first and second sets of elongated ribs and said reflective shield to the HCE.

2. The solar concentrator of claim 1, wherein a radial length of said elongated ribs of said first and second sets of elongated ribs is between about 1% and about 40% of a diameter of said generally cylindrical heat collection element (HCE).

3. A solar concentrator configured for attachment to a generally cylindrical outside surface of a heat collection element (HCE) positioned along a focal line of a parabolic reflector, comprising:

a first elongated rib having at least a first edge surface and at least a first reflective side surface, wherein said first edge surface of said first elongated rib is disposed along a length of an outsider surface of the HCE at a first radial location relative to a centerline axis of the HCE, wherein said first reflective side surface extends substantially radially outward from the outside surface of the HCE;

a second elongated rib having at least a second edge surface and at least a second reflective side surface, wherein said second edge surface of said second elongated rib is disposed along a length of the outside surface of the HCE at a second radial location relative to the centerline axis, wherein said second reflective side surface extends substantially radially outward from the outside surface of the HCE; and an elongated reflective shield having a reflective surface disposed toward the outside surface of the HCE, wherein said reflective shield is disposed along the outside surface of the HCE between said first radial position of said first elongated rib and said second radial position of said second elongated rib, wherein said elongated reflective shield is disposed on an outside surface of the HCE opposite of a vertex of the parabolic reflector.

4. The solar concentrator of claim 3, wherein said first and second radial positions of said first and second elongated ribs are located on opposite sides of a reference line extending between the vertex of the parabolic reflector and the centerline axis of the HCE.

5. The solar concentrator claim 4, wherein said first and second elongated ribs comprise a first set of elongated ribs and a second set of elongated ribs, respectively.

6. The solar concentrator of claim 5, wherein each rib of each said set of ribs includes an edge surface and a reflective side surface, wherein each rib is spaced from at least one adjacent rib when disposed on the outside surface of the HCE.

7. The solar concentrator of claim 6, wherein each set of elongated ribs includes a plurality of ribs radially spaced over about 15° (i.e., ~0.25 rad) and about 120° (i.e., ~2.1 rad) of the outside surface of the HCE.

8. The solar concentrator of claim 3, wherein said reflective shield covers between about 15° (i.e., ~0.26 rad) and about 120° (i.e., ~2.1 rad) of the outside surface of the HCE.

9. The solar concentrator of claim 3, wherein said reflective shield is corrugated.

10. The solar concentrator of claim 3, further comprising:
a tensile element extending through said first and second ribs and sized to extend around the HCE to secure said first and second ribs to the HCE.

11. The solar concentrator of claim 3, wherein a radial length of said first and second ribs is between about 1% and about 40% of a diameter of said generally cylindrical heat collection element (HCE).

12. The solar concentrator of claim 3, wherein a cross-sectional shape of said first and second elongated ribs is one of:
rectangular;
parabolic; and
curved.

13. A method of using a solar concentrator attachable to a generally cylindrical outside surface of a heat collection element (HCE) positioned along a focal line of a parabolic reflector, comprising:
disposing first and second sets of elongated ribs along a length of the HCE at different radial positions about the HCE, wherein at least one reflective side surface of each rib extends substantially radially outward from the outside surface of the HCE;
disposing a reflective shield on an outside surface of the HCEW between the first and second sets of elongated ribs, wherein a reflective surface of the reflective shield faces the HCE; and
utilizing the ribs and reflective shield to reflect stray light reflected from the parabolic reflector onto the HCE.

* * * * *